United States Patent
Tallent et al.

Patent Number: 5,529,201
Date of Patent: Jun. 25, 1996

[54] CAM-ON FILLER NECK CAP

[75] Inventors: Wallace D. Tallent, Greenfield; Jeffery Griffin, Connersville, both of Ind.

[73] Assignee: Stant Manufacturing Inc., Connersville, Ind.

[21] Appl. No.: 246,413

[22] Filed: May 20, 1994

[51] Int. Cl.⁶ .................................................. B65D 41/06
[52] U.S. Cl. ........................ 220/298; 220/86.2; 220/300; 220/302; 220/DIG. 33
[58] Field of Search .................................. 220/300, 298, 220/301, 293, 302, 86.2, DIG. 33; 215/332, 330, 342; 285/391, 392, 393, 395

[56] References Cited

U.S. PATENT DOCUMENTS

| | | | |
|---|---|---|---|
| 1,399,345 | 12/1921 | Henry | 220/302 |
| 1,659,703 | 2/1928 | Ramsey | 215/330 |
| 1,720,347 | 7/1929 | Reid | 220/301 |
| 1,749,604 | 3/1930 | Reid | 220/302 |
| 1,838,639 | 12/1931 | Reid | 220/302 |
| 1,855,649 | 4/1932 | Reid | 220/302 |
| 1,903,391 | 4/1933 | Shell | 220/302 |
| 2,652,945 | 9/1953 | Walker | 220/302 |
| 3,432,065 | 3/1969 | Bugla | 220/301 |
| 3,716,161 | 2/1973 | Julian et al. | 215/330 |
| 3,784,047 | 8/1974 | Cooper | 220/301 |
| 3,820,680 | 6/1974 | Friend . | |
| 4,379,574 | 4/1983 | Leichtl | 220/86.2 |
| 4,482,075 | 11/1984 | Stotz et al. | 220/86.2 |
| 4,515,245 | 5/1985 | Salmon | 220/86.2 X |
| 4,795,053 | 1/1989 | Kasugai et al. | 220/303 X |
| 4,887,733 | 12/1989 | Harris . | |
| 4,953,728 | 9/1990 | Meek | 215/330 X |
| 5,074,572 | 12/1991 | Delmerico | 220/298 X |
| 5,361,924 | 11/1994 | Muller | 220/293 |

*Primary Examiner*—Allan N. Shoap
*Assistant Examiner*—Robin A. Hylton
*Attorney, Agent, or Firm*—Barnes & Thornburg

[57] ABSTRACT

A closure assembly for a filler neck having a mouth and an inner mounting flange coupled thereto, wherein a closure for the mouth of the filler neck is provided with a body and an inner retainer fixed to the body. The inner retainer having a rigid portion and a cantilevered flexible portion and wherein rotation of the closure initially causes the rigid portion of the retainer to engage the flange so that the closure member is retained by the flange and continued rotation causes the cantilevered flexible portion to be deflected axially downward with respect to the axis of rotation of the closure, without radial movement toward the axis of rotation and to subsequently release the flexible portion to allow the flexible portion to move back to a undeflected position where a detent on the flexible portion enters a notch in the inner mounting flange to restrain relative rotation between the flange and retainer.

30 Claims, 3 Drawing Sheets

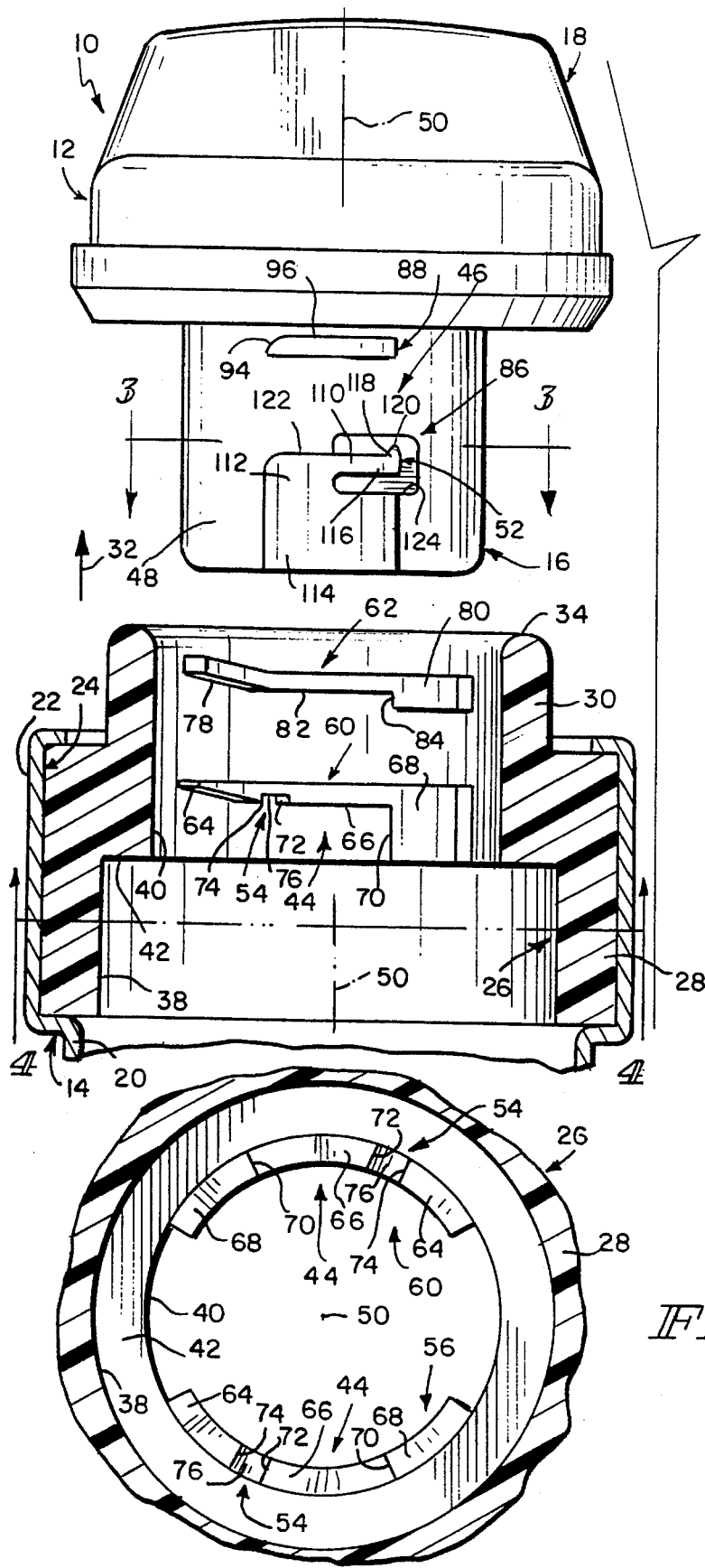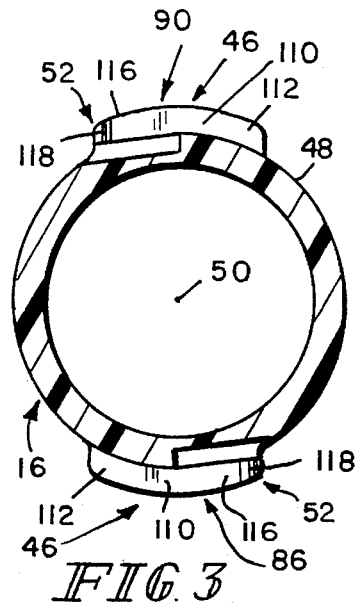
FIG. 2
FIG. 3
FIG. 4

CAM-ON FILLER NECK CAP

BACKGROUND AND SUMMARY OF THE INVENTION

This invention relates to filler neck caps, and particularly to a rotatable cam-on cap for closing the open mouth of a filler neck. More particularly, this invention relates to a cam-on filler neck cap having means for retaining the cap in an installed filler neck-closing position on the filler neck.

Conventional fuel caps for closing the filler neck of a vehicle fuel tank typically include a closure member for closing the mouth of the filler neck and a handle for turning the closure member to mount the closure member in the filler neck. Partial turn cam-on caps and multiple turn threaded caps are well-known types of caps for use in closing filler necks. Although such caps are currently in widespread use, it would be desirable to provide an alternative cap that is simpler to install on and remove from a filler neck.

It is known to provide a cam-on cap of the type having a shank portion which extends into the filler neck and is provided with pairs of conventional circumferentially spaced-apart cam lugs as disclosed in U.S. Pat. No. 4,887,733 to Harris. These cam lugs operate in the customary way to engage a filler neck configured to receive a cam-on cap and retain the cap in a fully tightened position closing the open mouth of the filler neck.

Alternatively, a conventional multiple turn cap includes a closure member that is threaded to be screwed into a threaded filler neck. For example, U.S. Pat. No. 3,820,680 to Friend discloses a multiple turn threaded cap and a compatible threaded filler neck. Typically, a multiple-turn threaded cap must be turned at least two and one-half or three full revolutions by the user after it is inserted into the threaded filler neck to connect the cap to the filler neck and establish a liquid and vapor seal between the cap and the filler neck.

More and more vehicle drivers are using the self-service bays at gasoline stations and filling their own fuel tanks. Some people have found that it is difficult to remove and install a conventional filler neck cap during refueling. A cap that is readily installable on and removable from a filler neck by a user without a lot of effort and that is configured to establish a sturdy sealed connection between the cap and the filler neck consistently during use would be a welcomed improvement over conventional caps.

What is needed is a cap that can be installed easily on a filler neck and that is retained mechanically in its installed filler neck-closing position to maintain fuel system integrity. In its installed filler neck-closing position, a tight seal should be established between the cap and the filler neck to block discharge of liquid fuel and fuel vapor from the filler neck. A cap that is configured to mount on a filler neck so that it is mechanically retained in a sealed filler neck-closing position without applying a load to the mechanical retention means would represent an improvement over conventional filler neck caps.

According to the present invention, a closure assembly is provided for a filler neck having a mouth. The closure assembly includes an inner mounting flange formed to include a notch and means for coupling the inner mounting flange to the filler neck at its mouth. The closure assembly further includes closure means for closing the mouth of the filler neck and handle means for rotating the closure means about an axis of rotation in the filler neck.

The closure means includes a body, an inner retaining member appended to the body, and a detent. The detent is appended to the inner retaining member and is sized to fit into the notch formed in the inner mounting flange during installation of the closure means in the filler neck. The handle means is operable to rotate the closure means relative to the filler neck about the axis of rotation to engage the inner retaining member appended to the body and the inner mounting flange appended to the filler neck and also project the detent into the notch formed in the inner mounting flange. The detent fits in the notch to retain the closure means mechanically in an installed filler neck-closing position closing the mouth of the filler neck.

In preferred embodiments, the detent includes a resilient latch arm having a fixed end cantilevered to the inner retaining member of the body and an opposite free end. An anti-drift lug is appended to the free end of the latch arm for releasably engaging the notch formed in the inner mounting flange appended to the filler neck upon rotation of the closure means in a cap-installation direction to its installed filler neck-closing position. This mechanical retention means provides a snap-fit connection that functions to block rotation of the closure means about its axis of rotation in the filler neck in a cap-removal direction once the operator turns the closure means to its filler neck-closing position using the handle means.

Advantageously, the anti-drift lug is sized to fit into the notch without deflecting the cantilevered latch arm in a downward direction into the filler neck and away from the inner mounting flange on the body upon arrival of the closure means at its installed filler neck-closing position. This extends the useful life of the detent because the latch arm is not loaded once the anti-drift lug snaps into the notch and the latch arm does not take a "thermal set" which might otherwise reduce the spring force of the cantilevered latch arm over time.

Illustratively, the body has a cylindrical shape and includes a pair of circumferentially spaced-apart annular inner retaining members and there is a detent appended to each of the annular inner retaining members. Likewise, a pair of circumferentially spaced-apart annular inner mounting flanges are appended to the filler neck and each inner mounting flange is formed to include a notch for receiving one of the two detents. Thus, there is a detent on each side of the cap for engaging a notch formed on each side of the filler neck to retain the cap mechanically to the filler neck upon arrival of the cap at its installed filler neck-closing position.

In preferred embodiments, the cylindrical body also includes a second pair of circumferentially spaced-apart annular retaining members and the filler neck includes a second pair of circumferentially spaced-apart annular mounting flanges. In the installed position, each second or axially outer retaining member engages one of the second or axially outer mounting flanges to hold the cap in place in the filler neck. At the same time, each axially inner retaining member engages one of the axially inner mounting flanges to assist in holding the cap in place in the filler neck. A detent is appended to each of the axially inner retaining members appended to the cylindrical body and is configured to snap into one of the notches formed in the axially inner mounting flanges appended to the filler neck to retain the body of the closure means in its installed filler neck-closing position.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 2 is a side elevation view of the cap and filler neck of FIG. 1 prior to insertion of the cap into the open mouth of the filler neck showing one set of axially inner and outer mounting flanges on the filler neck collar and one set of axially inner and outer retaining members on the cylindrical body of the cap;

FIG. 3 is a transverse sectional view taken through the cap along line 3—3 of FIG. 2 showing a detent on each side of the cylindrical cap body and showing that each detent includes a cantilevered latch arm appended to one of the axially inner retaining members and an anti-drift lug at the free end of the cantilevered latch arm;

FIG. 4 is a transverse sectional view taken through the filler neck along line 4—4 of FIG. 2 showing a detent-receiving notch formed on the bottom edge of each axially inner mounting flange appended to the filler neck collar;

FIG. 5 is a side elevation view of the cam-on cap and filler neck taken along line 5—5 of FIG. 1 during installation of the cap in the filler neck showing the position of one of the detents before it snaps into its companion detent-receiving notch and a relaxed O-ring seal before it is drawn tightly and compressed against the circular rim of the filler neck collar to establish a sealed connection between the cap and the filler neck;

DETAILED DESCRIPTION OF THE DRAWINGS

Figure 1:
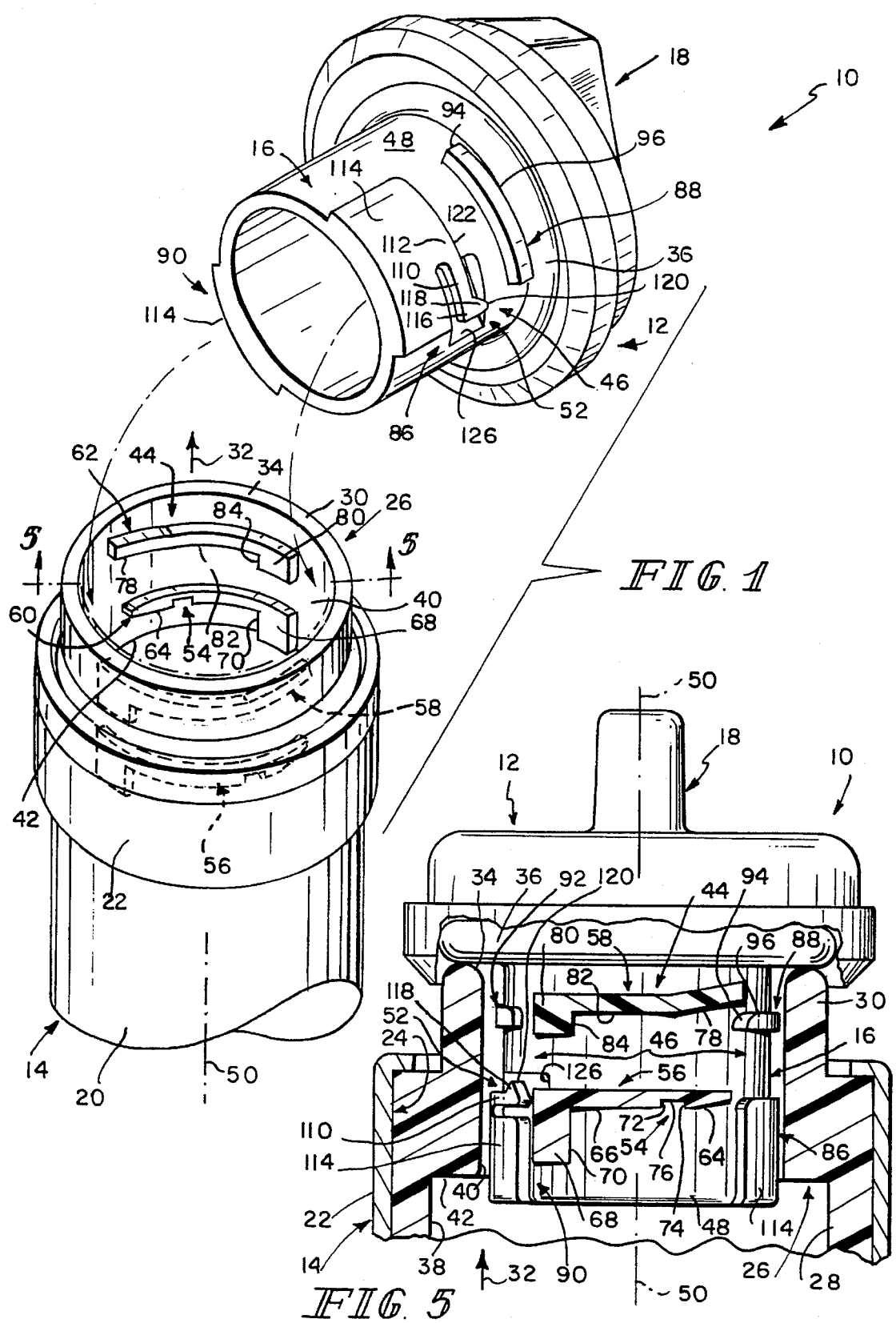
FIG. 1 is an exploded perspective view of a filler neck closure assembly in accordance with the present invention showing a collar in the filler neck carrying an axially inner mounting flange formed to include a detent-receiving notch and an axially outer mounting flange and a cam-on cap apart from the filler neck having a cylindrical body carrying an axially inner retaining member having a detent and an axially outer retaining member and a handle attached to the cylindrical body.

A closure assembly 10 in accordance with the present invention is illustrated in FIG. 1. Closure assembly 10 includes a cap 12 configured to mount on a filler neck 14. Cap 12 includes a cylindrical body 16 and an outer shell or handle 18 configured to provide a hand grip. The filler neck 14 includes a tube 20 having an enlarged diameter distal end 22 formed to include an annular channel 24 as shown best in FIG. 2.

A filler neck collar 26 is mounted to the distal end 22 of tube 20 so that its lower ring 28 is retained in the annular channel 24 and its upper ring 30 extends in an axially outer direction 32 away from the distal end 22 of tube 20. As shown best in FIGS. 1 and 5, the upper ring 30 is formed to include a rounded annular seat 34 for engaging a resilient O-ring seal 36 mounted on the cylindrical body 16 of cap 12 and arranged to lie underneath the handle 18. The O-ring seal 36 does not require a particular cross-section. It could be a controlled resilience rectangular cross-section, a V-shaped cross section, or other suitable shape.

As shown best in FIG. 2, the collar 26 is somewhat tubular and is formed to include a cylindrical axially outwardly extending interior side wall 38 in lower ring 28, a cylindrical axially outwardly extending interior side wall 40 in upper ring 30, and an annular radially inwardly extending, axially downwardly facing wall 42 interconnecting the lower ring interior side wall 38 and the upper ring interior side wall 40. Although in the illustrated embodiment the collar is shown to be a one-piece molded plastic element attached to a thin-walled metal filler neck tube, it will be understood that the collar could be a two-piece assembly or incorporated into tube 20 during the molding process.

Figure 7:
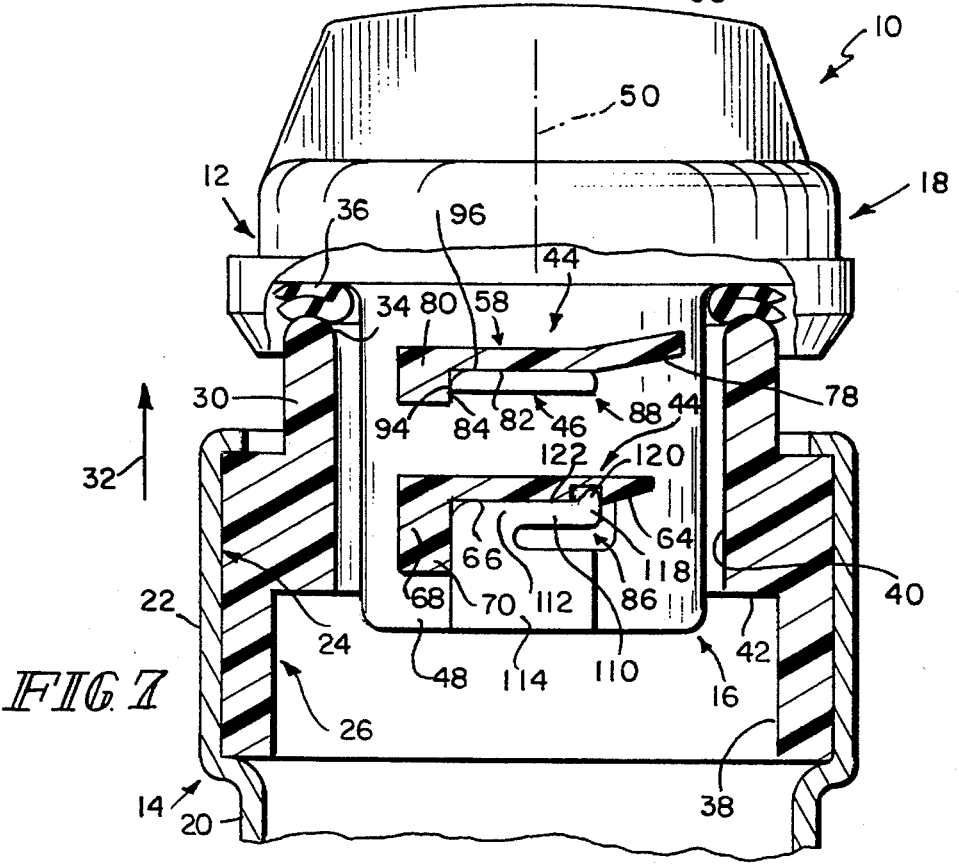
FIG. 7 is a view similar to FIG. 5 showing the cap in its installed filler neck-closing position and showing full compression of the O-ring seal and engagement of the anti-drift lug in the notch without loading or deflecting the cantilevered latch arm carrying the anti-drift lug.

The closure assembly 10 is configured to make it easy for anyone to install cap 12 in filler neck 14 with minimum effort and maximum retention. Flange means 44 is appended to the upper ring interior side wall 40 of filler neck collar 26 and arranged to engage retaining means 46 that is appended to the exterior side wall 48 of cylindrical body 16. Engagement of the flange means 44 and the retaining means 46 retains the cap 12 in filler neck 14 following (1) insertion of cap 12 into filler neck 14 as shown in FIGS. 2 and 5 and (2) rotation of cap 12 about axis of rotation 50 to an installed filler neck-closing position as shown in FIG. 7. Essentially, the retaining means 46 on the cap 12 engages and grips the flange means 44 on the filler neck to hold the cap 12 in the filler neck 14 and a detent 52 appended to the cap-retaining means 46 snaps into a notch 54 formed in the filler neck flange means 44 to prevent the cap 12 from rotating in the filler neck 14 away from its fully installed position.

Illustratively, the filler neck flange means 44 includes four flanges appended to the upper ring interior side wall 40, as shown in FIGS. 1, 4, and 5. As shown in FIG. 1, one set of flanges is appended to a "far" side of side wall 40 and includes a first inner mounting flange 56 and a first outer mounting flange 58. Another set of flanges is appended to a "near" side of side wall 40 and includes a second inner mounting flange 60 and a second outer mounting flange 62.

Each inner mounting flange 56, 60 is formed to include a detent-receiving notch 54, a cam ramp 64 on one side of the notch 54, and a downwardly facing edge 66 on the other side of the notch 54. Each inner mounting flange 56, 60 also includes a square base 68 having a stop face 70 oriented to lie at a right angle to the adjacent downwardly facing edge 66 as shown, for example, in FIGS. 1 and 5. Each inner mounting flange 56, 60 further includes a pair of spaced-apart vertical side walls 72, 74 and a horizontal top wall 76 interconnecting the vertical side walls 72, 74 as shown best in FIGS. 2, 4, and 5. The side walls 72, 74 and top wall 76 cooperate to define a perimeter boundary of the notch 54 therebetween.

Each outer mounting flange 58, 62 includes a cam ramp 78, a rectangular base 80, and a downwardly facing edge 82 extending between the ramp 78 and the rectangular base 80 as shown best in FIGS. 1 and 5. The rectangular base 80 has a stop face 84 oriented to lie at a right angle to the adjacent downwardly facing edge 82. The stop faces 84 on the two outer mounting flanges 58, 62 and the underlying stop faces 70 on the two inner mounting flanges 56, 60 are arranged on the filler neck collar 26 to intercept and engage leading edges of the retaining means 46 on the cap 12 as shown in the cap-installation sequence illustrated in FIGS. 6 and 7 during rotation of the cap 12 in a cap-advancing direction 98. Thus, the stop faces 70, 84 function to block rotation of the cap 12 relative to the filler neck 14 past its installed, fully tightened, filler neck-closing position as shown in FIG. 7.

Illustratively, the cap-retaining means 46 includes four retaining members appended to the exterior side wall 48 of cylindrical body 16 as shown in FIGS. 1, 3, and 5. As shown in FIGS. 1 and 5, one set of retaining members is appended to the "right" side of side wall 48 and includes a first inner retaining member 86 and a first outer retaining member 88. Another set of retaining members is appended to the "left" side of side wall 48 and includes a second inner retaining member 90 and a second outer retaining member 92.

Figure 6:
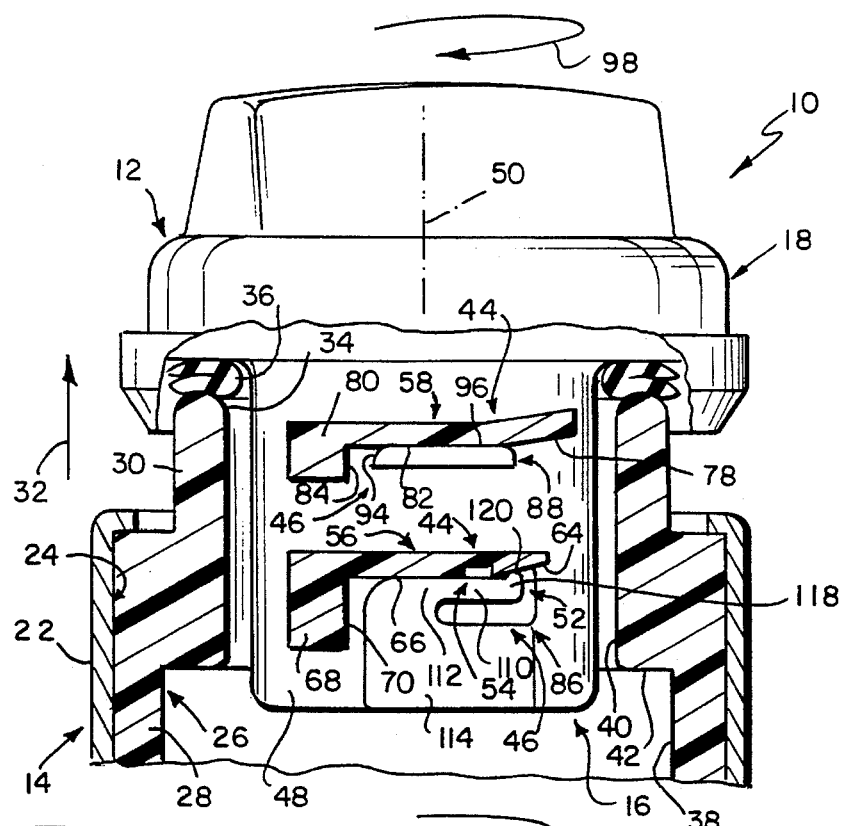
FIG. 6 is a view similar to FIG. 5 showing the position of one of the anti-drift lugs on a cam ramp appended to one of the axially inner mounting flanges on the filler neck during rotation of the cap about its vertical axis of rotation toward its installed filler neck-closing position.

Each of the outer retaining members 88, 92 on the cap 12 engages one of the mating outer mounting flanges 58, 62 on the filler neck 14 as shown in FIG. 7 to block pullout of the cap 12 from the filler neck 14 following proper installation of the cap 12 in the filler neck 14. Each outer retaining member 88, 92 includes a leading edge 94 that first engages cam ramp 78 and then engages stop face 84 on its companion outer mounting flange 58, 62 during rotation of cap 12 about axis of rotation 50 in a cap-advancing direction 98 as shown in FIGS. 5–7. Each outer retaining member 88, 92 also includes an upwardly facing edge 96 for engaging the downwardly facing edge 82 on a companion outer mounting flange 58, 62 once the cap 12 is installed in filler neck 14 as shown in FIG. 7 to increase the pullout resistance of cap 12 in filler neck 14.

Illustratively, a detent 52 is appended to each of the inner retaining members 86, 90 and is sized to engage the detent-receiving notch 54 formed in each of the inner mounting flanges 56, 60. Each detent 52 includes a resilient latch arm 110 having a fixed end 112 cantilevered to a base portion 114 of a companion inner retaining member 86, 90 and an opposite free end 116 as shown best in FIGS. 1 and 2. An anti-drift lug 118 is appended to the free end 116 and sized to fit into one of the notches 54 formed in the inner mounting flanges 56, 60. The anti-drift lugs 118 engage the notches 54 upon rotation of the cap 12 in a cap-installation direction 98 to its installed filler neck-closing position so that drifting rotation of the cap 12 about its axis of rotation in a cap-removal direction opposite to the cap-installation direction 98 is substantially blocked. Preferably, each anti-drift lug 118 has a somewhat triangular shape to assist in camming against cam ramp 64 during installation of the cap 12 and against side wall 74 during removal of the cap 12.

Each anti-drift lug 118 and notch 54 combination is sized and shaped so that the anti-drift lug 118 does not act against the top wall 76 of the notch or any other part of the inner mounting flange 56 or 60 to deflect the cantilevered latch arm 110 in a downward direction away from the inner mounting flange 56 or 60 upon arrival of the cap 12 at its installed filler neck-closing position shown in FIG. 7. Such deflection would not be desirable because it could otherwise limit the hysteresis of the resilient latch arm 110 and cause the latch arm to lose elasticity and take a permanent set. As shown in FIG. 7, the anti-drift lug 118 includes a peak tip 120 that is positioned to lie in vertically spaced-apart relation both to the upwardly facing edge 122 of the inner retaining member 86 or 90 and to the top wall 76 of the notch 54 upon rotation of the cap 12 to its installed filler neck-closing position.

As shown in FIGS. 1–3, the cylindrical body 16 is formed to include a recessed channel 124 adjacent to each resilient latch arm 110. The latch arm 110 and the anti-drift lug 118 are positioned to lie adjacent to the recessed channel 124 and away from the exterior wall 48 of cylindrical body 16.

In use, the cap 12 is inserted into the open mouth of filler neck 14 in the manner shown in FIGS. 1 and 5 so that each set of inner and outer retaining members 86, 88 and 90, 92 on the cap 12 passes through one of the vertical channels or spaces provided between the circumferentially spaced-apart sets of inner and outer mounting flanges 56, 58 and 60, 62 on the filler neck 14. The cap 2 is then pushed far enough into the filler neck 14 to cause the O-ring seal 36 around the cylindrical body 16 to touch the rounded annular seat 34 on the filler neck collar 26 as shown, for example, in FIG. 5. At this point, the operator begins to rotate the cap 12 about its axis of rotation 50 in cap-advancing direction 98 as shown in FIG. 6. The cap 12 reaches its fully installed position after being turned one-quarter turn (9°) about the axis of rotation 50. At that point, the leading edge 94 of each outer cap-retaining member 88, 92 engages the fixed stop face 84 on each outer filler neck-mounting flange 58, 60 as shown in FIG. 7 to block further rotation of cap 12 in cap-advancing direction 96. O-ring seal 36 is now trapped and squeezed between cap 12 and filler neck 14 to establish a liquid fuel and fuel vapor seal therebetween.

Both pairs of inner and outer retaining members do not necessarily have to be in physical contact with their respective mounting flanges during installation of cap 12 on filler neck 14. For example, there could be a slight (controlled) clearance between the outer retaining members 86, 88 and the outer flanges 60, 62 while the inner retaining members 86, 88 are in contact with the inner retaining flanges 56, 58. The purpose for having inner and outer retaining members is to give the cap stability when loads are applied in a lateral direction. For example, in a vehicle crash situation, the added lateral stability helps to prevent separation of the seal on the cap from the seal bead on the fill neck, and thus minimizes the opportunity for fuel leakage.

There are many advantages achieved by the structure of closure assembly 10. Cap 12 is easy to install in filler neck 14 because it is fully mounted after only one-quarter turn in the filler neck 14. Further, the dwell area between the mating mounting flanges and retaining members is perpendicular to the cap centerline 50 and parallel to the annular sealing seat 34. Also, the resilient latch arms 110 provide a detent to block drifting rotation of the cap 12 in a cap-removal direction once the cap 12 has been moved to its installed position.

Moreover, there is no loss of retention due to heat set of the plastic latch arms 110. The latch arms 110 are not loaded in either the full on or full off positions of the cap 12 relative to the filler neck 14. The top wall 76 of notch 54 in filler neck 14 is greater than the highest point of peak tip 120 on anti-drift lug 118. In practice, the peak tip 120 only contacts the filler neck-mounting flanges 56, 60 at its highest point during cap rotation in filler neck (and not when it has been moved to its fully installed filler neck-closing position).

Advantageously, the amount of compression on O-ring seal 36 when the cap 12 is fully installed as shown in FIG. 7 is not operator-controlled. The cap 12 is positively stopped by stop faces 70, 84 and stopping of the cap 12 is not controlled by the magnitude of torque that is required to install a threaded cap. Moreover, the ramps 64, 78 used to cam the rotating cap 12 to its installed position are short in length so that the cap 12 is either loose in the filler neck 14 or properly installed in the filler neck 14.

Although the invention has been described in detail with reference to certain preferred embodiments, variations and modifications exist within the scope and spirit of the invention as described and defined in the following claims.

What is claimed is:

1. A closure assembly for a filler neck having a mouth, the closure assembly comprising an inner mounting flange formed to include a notch, means for coupling the inner mounting flange to the filler neck at its mouth, closure means for closing the mouth of the filler neck, the closure means including a body, an inner retaining member appended to the body, and a detent appended to the inner retaining member and sized to fit into the notch formed in the inner mounting flange, handle means for rotating the closure means relative to the inner mounting flange about an axis of rotation to engage the inner retaining member and the inner mounting flange so that the closure means is retained by the inner mounting flange in an installed filler neck-closing position closing the mouth of the filler neck and to project the detent into the notch to hold the inner retaining member and the inner mounting flange in engagement, wherein the detent includes a resilient latch arm having a fixed end cantilevered to the inner retaining member and a free end and anti-drift means on the free end of the latch arm for releasably engaging the notch formed in the inner mounting flange upon rotation of the closure means in a cap-installation direction to its installed filler neck-closing position so that drifting rotation of the closure means about its axis of rotation in an opposite cap-removal direction is substantially blocked, and wherein the anti-drift means includes a triangular lug configured to lie in the notch formed in the inner mounting flange without deflecting the cantilevered latch arm in a downward direction away from the inner mounting flange upon arrival of the closure means at its installed filler neck-closing position.

2. A closure assembly for a filler neck having a mouth, the closure assembly comprising an inner mounting flange formed to include a notch, means for coupling the inner mounting flange to the filler neck at its mouth, closure means for closing the mouth of the filler neck, the closure means including a body, an inner retaining member appended to the body and a detent appended to the inner retaining member and sized to fit into the notch formed in the inner mounting flange, handle means for rotating the closure means relative to the inner mounting flange about an axis of rotation to engage the inner retaining member and the inner mounting flange so that the closure means is retained by the inner mounting flange in an installed filler neck-closing position closing the mouth of the filler neck and to project the detent into the notch to hold the inner retaining member and the inner mounting flange in engagement, wherein the detent includes a resilient latch arm having a fixed end cantilevered to the inner retaining member and a free end and anti-drift means on the free end of the latch arm for releasably engaging the notch formed in the inner mounting flange upon rotation of the closure means in a cap-installation direction to its installed filler neck-closing position so that drifting rotation of the closure means about its axis of rotation in an opposite cap-removal direction is substantially blocked, wherein the body of the closure means includes an exterior wall and a recessed channel formed in the exterior wall, the inner retaining member is appended to the exterior wall, and the latch arm and anti-drift means are positioned to lie adjacent to the recessed channel and away from the exterior wall.

3. The closure assembly of claim 2, wherein the exterior wall of the body has a cylindrical shape, the inner retaining member extends about a portion of the circumference of the cylindrical exterior wall to a point adjacent to the recessed channel, the latch arm is an annular segment having a center of curvature at the axis of rotation of the closure means, and the anti-drift means includes an anti-drift lug extending axially away from the free end of the latch arm in spaced-apart parallel relation to the axis of rotation of the closure means.

4. A closure assembly for a filler neck having a mouth, the closure assembly comprising an inner mounting flange formed to include a notch, means for coupling the inner mounting flange to the filler neck at its mouth, closure means for closing the mouth of the filler neck, the closure means including a body, an inner retaining member appended to the body, and a detent appended to the inner retaining member and sized to fit into the notch formed in the inner mounting flange, handle means for rotating the closure means relative to the inner mounting flange about an axis of rotation to engage the inner retaining member and the inner mounting flange so that the closure means is retained by the inner mounting flange in an installed filler neck-closing position closing the mouth of the filler neck and to project the detent into the notch to hold the inner retaining member and the inner mounting flange in engagement, wherein the detent includes a resilient latch arm having a fixed end cantilevered to the inner retaining member and a free end and anti-drift means on the free end of the latch arm for releasably engaging the notch formed in the inner mounting flange upon rotation of the closure means in a cap-installation direction to its installed filler neck-closing position so that drifting rotation of the closure means about its axis of rotation in an opposite cap-removal direction is substantially blocked, wherein the inner mounting flange includes a pair of spaced-apart vertical side walls and a horizontal top wall interconnecting the spaced-apart vertical side walls, the top wall and side walls cooperate to define a perimeter boundary of the notch therebetween, the inner retaining member includes an upwardly facing edge arranged to engage the inner mounting flange upon movement of the closure means to its installed filler neck-closing position, and the anti-drift means includes an anti-drift lug formed to include a peak tip lying in vertically spaced-apart relation both to the upwardly facing edge of the inner retaining member and to the top wall of the notch upon rotation of the closure means to its installed filler neck-closing position.

5. The closure assembly of claim 4, wherein the inner retaining member further includes an inclined cam ramp positioned to lie between the upwardly facing edge of the inner retaining member and the peak tip of the anti-drift lug.

6. A closure assembly for a filler neck having a mouth, the closure assembly comprising an inner mounting flange formed to include a notch, means for coupling the inner mounting flange to the filler neck at its mouth, closure means for closing the mouth of the filler neck, the closure means including a body, an inner retaining member appended to the body, and a detent appended to the inner retaining member and sized to fit into the notch formed in the inner mounting flange, handle means for rotating the closure means relative to the inner mounting flange about an axis of rotation to engage the inner retaining member and the inner mounting flange so that the closure means is retained by the inner mounting flange in an installed filler neck-closing position closing the mouth of the filler neck and to project the detent into the notch to hold the inner retaining member and the inner mounting flange in engagement, and wherein the coupling means includes a mounting ring including means for attaching to the filler neck and an annular inner wall around the mouth of the filler neck and the inner mounting flange is appended to the annular inner wall.

7. The closure assembly of claim 6, wherein the detent includes a resilient latch arm having a fixed end cantilevered to the inner retaining member and a free end and anti-drift means on the free end of the latch arm for releasably engaging the notch formed in the inner mounting flange upon rotation of the closure means in a cap-installation direction to its installed filler neck-closing position so that drifting rotation of the closure means about its axis of rotation in a cap-removal direction opposite to the cap-installation direction is substantially blocked.

8. The closure assembly of claim 7, wherein the anti-drift means includes a triangular lug configured to lie in the notch formed in the inner mounting flange without deflecting the cantilevered latch arm in a downward direction away from the inner mounting flange upon arrival of the closure means at its installed filler neck-closing position.

9. The closure assembly of claim 7, wherein the inner mounting flange includes a downwardly facing edge facing into the filler neck and having opposite ends, ramp means at a first of the opposite ends for camming the inner retaining member, latch arm, and anti-drift means during rotation of the closure means about its axis of rotation toward its installed filler neck-closing position to place an upwardly facing edge of the inner retaining member into confronting relation with the downwardly facing edge of the inner mounting flange, and stop means at a second of the opposite ends for engaging an end portion of the inner retaining member during rotation of the closure means in a cap-installation direction about its axis of rotation toward its installed filler neck-closing position to block further rotation in the cap-installation direction and to place the anti-drift means in the notch formed in the inner mounting flange to limit rotation of the closure means relative to the filler neck in a cap-removal direction opposite to the cap-installation direction.

10. The closure assembly of claim 6, further comprising an outer mounting flange coupled to the annular inner wall of the mounting ring and arranged to lie in spaced-apart relation to the inner mounting flange, and an outer retaining member appended to the body of the closure means and arranged to lie in spaced-apart relation to the inner retaining member and engage the outer mounting flange upon movement of the closure means to its installed filler neck-closing position.

11. The closure assembly of claim 10, wherein the outer mounting flange includes a downwardly facing edge facing toward the mouth of the filler neck and having opposite ends, ramp means at a first of the opposite ends for camming the upper retaining member to place an upwardly facing edge of the outer retaining member into engagement with the downwardly facing edge of the outer mounting flange during rotation of the closure means relative to the inner mounting flange to the installed filler neck-closing position, and stop means at a second of the opposite ends for engaging an end portion of the outer retaining member during rotation of the closure means in a cap-installation direction relative to the inner mounting flange to the installed filler neck-closing position to block continued rotation of the closure means in the cap-installation direction about its axis of rotation.

12. A closure assembly for a filler neck having an annular lip forming a mouth, the closure assembly comprising an axially outer mounting flange coupled to the filler neck and arranged to lie adjacent to the mouth of the filler neck, an axially inner mounting flange coupled to the filler neck and arranged to lie in the filler neck in axially inwardly spaced-apart relation to the axially outer mounting flange, closure means for closing the mouth of the filler neck, the closure means being rotatable about an axis of rotation in the filler neck in a cap-installation direction to close the mouth and an opposite cap-removal direction to open the mouth, the closure means including a body, an annular seal carried on the body, an axially inner retaining member appended to the body and positioned to lie in axially spaced-apart relation to the annular seal, and an axially outer retaining member appended to the body and positioned to lie between the annular seal and the inner retaining member, detent means for releasably engaging the axially inner mounting flange to limit rotation of the closure means in the filler neck in the cap-removal direction, the detent means being appended to the axially inner retaining member, and handle means for rotating the body relative to the axially inner and outer mounting flanges about the axis of rotation in the cap-installation direction to engage the axially outer retaining member and the axially outer mounting flange and thereby draw the annular seal carried on the body in an axially downward direction against the annular lip of the filler neck to establish a tight sealed connection between the body and the filler neck without applying a loading force urging the detent means against the axially inner retaining member.

13. The closure assembly of claim 12, wherein the detent means includes a resilient latch arm extending about a portion of the circumference of the body and having a fixed end cantilevered to the axially inner retaining member and a free end and anti-drift means on the free end of the latch arm for releasably engaging the axially inner mounting flange upon engagement of the axially outer retaining member and the axially outer mounting flange to limit rotation of the cap in the cap-removal direction.

14. The closure assembly of claim 13, wherein the axially inner mounting flange is formed to include a lug-receiving notch and the anti-drift means includes an anti-drift lug extending axially away from the free end of the latch arm in spaced-apart parallel relation to the axis of rotation of the closure means and into the lug-receiving notch upon engagement of the axially outer retaining member and the axially outer mounting flange without deflecting the cantilevered latch arm in an axially inward direction away from the axially inner mounting flange.

15. The closure assembly of claim 13, wherein the inner mounting flange includes a pair of spaced-apart vertical side walls and a horizontal top wall interconnecting the spaced-apart vertical side walls, the top wall and side walls cooperate to define a perimeter boundary of the notch therebetween, the inner retaining member includes an upwardly facing edge arranged to engage the inner mounting flange upon movement of the closure means to its installed filler neck-closing position, and the anti-drift means includes an anti-drift lug formed to include a peak tip lying in vertically spaced-apart relation both to the upwardly facing edge of the inner retaining member and to the top wall of the notch upon rotation of the closure means to its installed filler neck-closing position.

16. The closure assembly of claim 15, wherein the inner retaining member further includes an inclined cam ramp positioned to lie between the upwardly facing edge of the inner retaining member and the peak tip of the anti-drift lug.

17. The closure assembly of claim 13, wherein the inner mounting flange includes a downwardly facing edge facing into the filler neck and having opposite ends, ramp means at a first of the opposite ends for camming the inner retaining member, latch arm, and anti-drift means during rotation of the closure means about its axis of rotation toward its installed filler neck-closing position to place an upwardly facing edge of the inner retaining member into confronting relation with the downwardly facing edge of the inner mounting flange, and stop means at a second of the opposite ends for engaging an end portion of the inner retaining member during rotation of the closure means in a cap-installation direction about its axis of rotation toward its installed filler neck-closing position to block further rotation in the cap-installation direction and to place the anti-drift means in the notch formed in the inner mounting flange to limit rotation of the closure means relative to the filler neck in a cap-removal direction opposite to the cap-installation direction.

18. The closure assembly of claim 17, wherein the outer mounting flange includes a downwardly facing edge facing toward the mouth of the filler neck and having opposite ends, ramp means at a first of the opposite ends for camming the outer retaining member to place an upwardly facing edge of the outer retaining member into engagement with the downwardly facing edge of the outer mounting flange during rotation of the closure means relative to the inner mounting flange to the installed filler neck-closing position, and stop means at a second of the opposite ends for engaging an end portion of the outer retaining member during rotation of the closure means in a cap-installation direction relative to the inner mounting flange to the installed filler neck-closing position to block continued rotation of the closure means in the cap-installation direction about its axis of rotation.

19. A closure assembly for a filler neck having an annular lip forming a mouth, the closure assembly comprising a collar appended to the filler neck, the collar including first and second annular inner mounting flanges lying in a first plane transverse to the filler neck and in circumferentially spaced-apart relation one to another and first and second annular outer mounting flanges lying in a second plane transverse to the filler neck and in circumferentially spaced-apart relation one to another, the first annular outer mounting flange being arranged to lie between the first annular inner mounting flange and the annular rim in a position vertically above the first annular inner mounting flange, the second annular outer mounting flange being arranged to lie between the second annular inner mounting flange and the annular rim in a position vertically above the second annular inner mounting flange, closure means for closing the mouth of the filler neck, the closure means being rotatable about an axis of rotation in the filler neck in a cap-installation direction to close the mouth and an opposite cap-removal direction to open the mouth, the closure means including a cylindrical body, an O-ring seal carried on the body, circumferentially spaced-apart first and second annular inner retaining members appended to the cylindrical body, circumferentially spaced-apart first and second annular outer retaining members appended to the cylindrical body and arranged to lie between the annular rim and the first and second annular inner retaining members, means for positively stopping rotation of the closure means about its axis of rotation relative to the collar in a cap-installation direction at an installed filler neck-closing position, detent means for releasably engaging the first and second annular inner mounting flanges to limit rotation of the closure means relative to the collar in the filler neck in the cap-removal direction, the detent means being appended to the first and second annular inner retaining members, and handle means for rotating the closure means relative to the collar about the axis of rotation in the cap-installation direction to slide the first annular outer retaining member into engagement with the first annular outer mounting flange and the second annular outer retaining member into engagement with the second annular outer mounting flange and to slide the first annular inner retaining member into engagement with the first annular inner mounting flange and the second annular inner retaining member into engagement with the second annular inner mounting flange until one of the first and second annular outer retainer members engages the stopping means so that the O-ring seal carried on the body is drawn in an axially downwardly direction against the annular lip of the filler neck to establish a tight sealed connection between the body and the filler neck without applying a loading force urging the detent means against the first and second axially inner mounting flanges.

20. The closure assembly of claim 19, wherein the detent means includes a resilient latch arm extending about a portion of the circumference of the body and having a fixed end cantilevered to the first annular inner retaining member and a free end and anti-drift means on the free end of the latch means for releasably engaging the first annular inner mounting flange upon engagement of the first annular outer retaining member and the first annular outer mounting flange to limit rotation of the closure means in the cap-removal direction.

21. The closure assembly of claim 20, wherein the first annular inner mounting flange is formed to include a lug-receiving notch and the anti-drift means includes an anti-drift lug extending axially away from the free end of the latch arm in spaced-apart parallel relation to the axis of rotation of the closure means and into the lug-receiving notch upon engagement of the first annular outer retaining member and the first annular outer mounting flange without deflecting the cantilevered latch arm in an axially inward direction away from the first annular inner mounting flange.

22. The closure assembly of claim 20, wherein the first annular inner mounting flanges includes a pair of spaced-apart vertical side walls and a horizontal top wall interconnecting the spaced-apart vertical side walls, the top wall and side walls cooperate to define a perimeter boundary of the notch therebetween, the first annular inner retaining member includes an upwardly facing edge arranged to engage the first annular inner mounting flange upon movement of the closure means to its installed filler neck-closing position, and the anti-drift means includes an anti-drift lug formed to include a peak tip lying in vertically spaced-apart relation both to the upwardly facing edge of the first annular inner retaining member and to the top wall of the notch upon rotation of the closure means to its installed filler neck-closing position.

23. The closure assembly of claim 22, wherein the first annular inner retaining member further includes an inclined cam ramp positioned to lie between the upwardly facing edge of the first annular inner retaining member and the peak tip of the anti-drift lug.

24. The closure assembly of claim 20, wherein the first annular inner mounting flange includes a downwardly facing edge facing into the filler neck and having opposite ends, ramp means at a first of the opposite ends for camming the first annular inner retaining member, latch arm, and anti-drift means during rotation of the closure means about its axis of rotation toward its installed filler neck-closing position to place an upwardly facing edge of the first annular inner retaining member into confronting relation with the downwardly facing edge of the first annular inner mounting flange and stop means at a second of the opposite ends for engaging an end portion of the first annular inner retaining member during rotation of the closure means in a cap-installation direction about its axis of rotation toward its installed filler neck-closing position to block further rotation in the cap-installation direction and to place the anti-drift means in the notch formed in the first annular inner mounting flange to limit rotation of the closure means relative to the filler neck in a cap-removal direction opposite to the cap-installation direction.

25. The closure assembly of claim 24, wherein the first annular outer mounting flange includes a downwardly facing edge facing toward the mouth of the filler neck and having opposite ends, ramp means at a first of the opposite ends for camming the first annular outer retaining member to place an upwardly facing edge of the outer retaining member into engagement with the downwardly facing edge of the outer mounting flange during rotation of the closure means relative to the first annular inner mounting flange to the installed filler neck-closing position, and stop means at a second of the opposite ends for engaging an end portion of the first annular outer retaining member during rotation of the closure means in a cap-installation direction relative to the first annular inner mounting flange to the installed filler neck-closing position to block continued rotation of the closure means in the cap-installation direction about its axis of rotation.

26. A closure assembly for a vehicle filler neck having an annular lip forming a mouth, the closure assembly comprising:

an axially outer mounting flange coupled to the filler neck and arranged to lie adjacent to the mouth of the filler neck, an axially inner mounting flange coupled to the filler neck and arranged to lie in the filler neck in axially inwardly spaced-apart relation to the axially outer mounting flange, a cap for closing the mouth of the filler neck, the cap being rotatable about an axis of rotation in the filler neck in a cap-installation direction to close the mouth and an opposite cap-removal direction to open the mouth, the cap including a body, an annular seal carried on the body, an axially inner retaining member appended to the body and positioned to lie in axially spaced-apart relation to the annular seal, and an axially outer retaining member appended to the body and positioned to lie between the annular seal and the inner retaining member, a detent for releasably engaging the axially inner mounting flange to limit rotation of the closure means in the filler neck in the cap-removal direction, the detent being appended to the axially inner retaining member, and handle means for rotating the body relative to the axially inner and outer mounting flanges about the axis of rotation in the cap-installation direction to engage the axially outer retaining member and the axially outer mounting flange and thereby draw the annular seal carried on the body in an axially downward direction against the annular lip of the filler neck to establish a tight sealed connection between the body and the filler neck without applying a loading force urging the detent against the axially inner retaining member.

27. The closure assembly of claim 26, wherein the detent includes a resilient latch arm extending about a portion of the circumference of the body and having a fixed end cantilevered to the axially inner retaining member and a free end and an anti-drift lug on the free end of the latch arm for releasably engaging the axially inner mounting flange upon engagement of the axially outer retaining member and the axially outer mounting flange to limit rotation of the cap in the cap-removal direction.

28. The closure assembly of claim 27, wherein the axially inner mounting flange is formed to include a lug-receiving notch and the anti-drift lug extends axially away from the free end of the latch arm in spaced-apart parallel relation to the axis of rotation of the cap and into the lug-receiving notch upon engagement of the axially outer retaining member and the axially outer mounting flange without deflecting the cantilevered latch arm in an axially inward direction away from the axially inner mounting flange.

29. A closure assembly for a filler neck having a mouth, the closure assembly comprising:

an inner mounting flange having a cam surface portion, and a flat surface portion wherein said inner mounting flange is coupled to the filler neck adjacent its mouth, a closure means for closing the mouth of the filler neck comprising a body and an inner retaining member fixed to the body and having a cantilevered flexible portion, handle means for rotating the closure means toward a closed position in which the mouth of the filler neck is closed and wherein upon rotation of the closure means, initially the inner retainer member is cammed downwardly by the cam surface portion of the inner flange member without flexure of the cantilevered flexible portion to close the filler neck and wherein continued rotation of the closure means causes the cantilevered flexible portion to move to a position where it coacts with a notch to maintain the inner retainer member in its cammed downward position, wherein the cam surface portion of the inner mounting flange contacts a detent on the cantilevered flexible portion to initially flex the flexible portion away from the notch upon rotation of the closure means and wherein continued rotation of the closure means aligns the detent of the flexible portion with the notch and causes release of the detent from the cam surface allowing the detent on the flexible portion to flex back and enter into the notch, and wherein the detent does not contact any walls of the notch when fully entered therein.

30. The closure assembly of claim 29 wherein flexure of the cantilevered portion causes downward movement of the cantilevered portion in alignment with the axis of rotation of the closure assembly and without radial movement of the flexible portion with respect to the axis of rotation of the closure assembly.

* * * * *